United States Patent [19]

Dubberke

[11] 3,861,616

[45] Jan. 21, 1975

[54] BALE TRANSPORTING AND UNROLLING DEVICE

[76] Inventor: Gail S. Dubberke, Rte. No. 4, Osceola, Iowa 50213

[22] Filed: Nov. 12, 1973

[21] Appl. No.: 414,677

[52] U.S. Cl. ............................ 242/86.5 R, 214/390
[51] Int. Cl. ............................................ B65h 75/40
[58] Field of Search ................... 242/86.5 R, 86.52; 214/390, 392

[56] References Cited
UNITED STATES PATENTS
2,913,194  11/1959  Garnett .......................... 242/86.5 R
2,934,228  4/1960  Hillberg .............................. 214/390
3,039,633  6/1962  Mindrum ............................ 214/390

Primary Examiner—John W. Huckert
Assistant Examiner—Edward J. McCarthy
Attorney, Agent, or Firm—Zarley, Mckee, Thomte & Voorhees

[57] ABSTRACT

A bale transporting and unrolling device comprising a wheeled frame means adapted to be secured at its forward end to a prime mover and having a rearward end which may be opened to permit the frame means to be moved rearwardly with respect to a ground supported bale so that the frame means extends around the bale. A hydraulic cylinder means is operatively connected to the pivotal wheels of the frame means so that the frame means may be raised and lowered relative to the ground. An elongated shaft is screwed through the middle of the bale so that the opposite ends thereof protrude from the ends of the bale. Support means is provided on the frame means for engagement with the opposite ends of the shaft so that upward movement of the frame means will cause the support means to engage the opposite ends of the shaft so that the bale is raised from the ground. A roller means extends across the rearward end of the frame means to assist in unrolling the bale when the bale has been moved to its desired location. A modified form of the device is also disclosed wherein the bale is supported by a pair of pipes which extend beneath the bale with the opposite ends of the pipes being supported by the opposite sides of the frame means. The method of unrolling the bale is also disclosed.

9 Claims, 5 Drawing Figures

PATENTED JAN 21 1975  3,861,616

BALE TRANSPORTING AND UNROLLING DEVICE

BACKGROUND OF THE INVENTION

This invention relates to a bale transporting and unrolling device and more particularly to a bale transporting and unrolling device which may be employed to transport and unroll the extremely large bales that are now being used in the cattle feeding industry. Modern technology has provided baling devices which roll straw or hay into extremely large and heavy bales frequently weighing in excess of 1,000 pounds. The large bales are difficult to transport from one location to another and are difficult to unroll once they have been transported to the feed lot.

Therefore, it is a principal object of the invention to provide a bale transporting device.

A further object of the invention is to provide a bale transporting and unrolling device.

A further object of the invention is to provide a bale transporting and unrolling device for use with extremely large and heavy bales.

A further object of the invention is to provide a bale transporting and unrolling device which is easy to use.

A further object of the invention is to provide a bale transporting and unrolling device which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENTS

Figure 1:
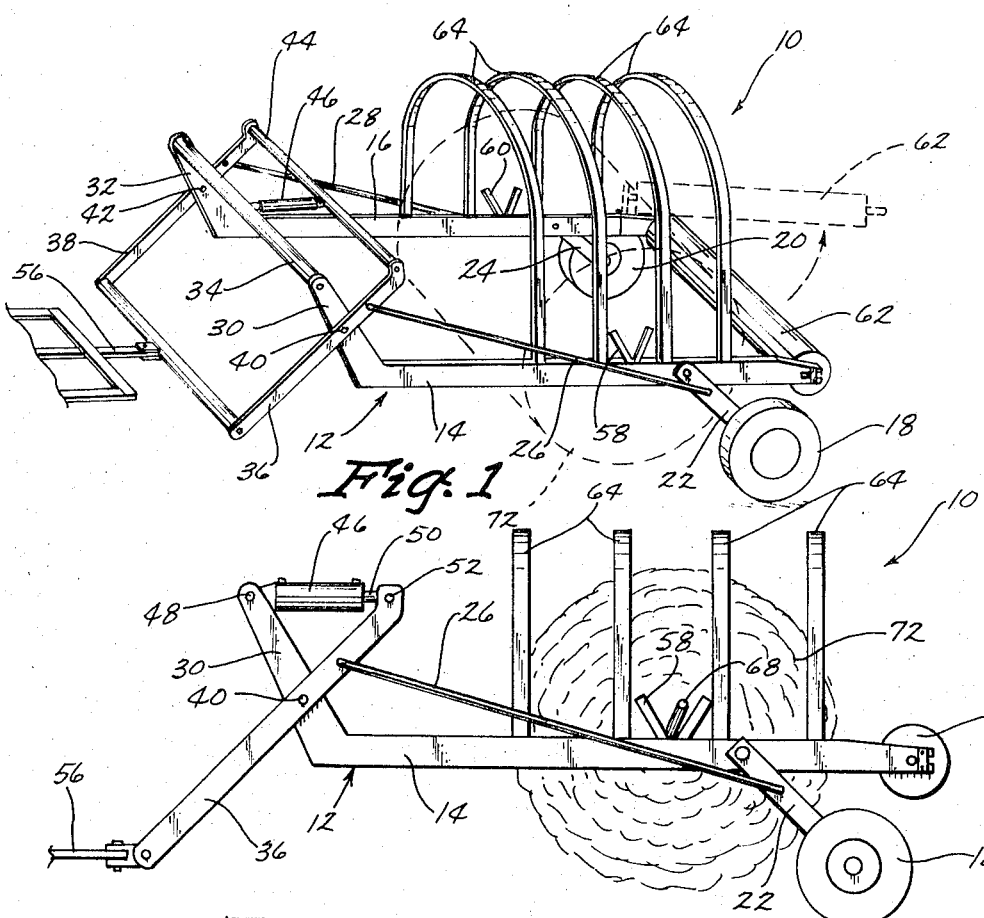
FIG. 1 is a perspective view of the device.
Figure 2:
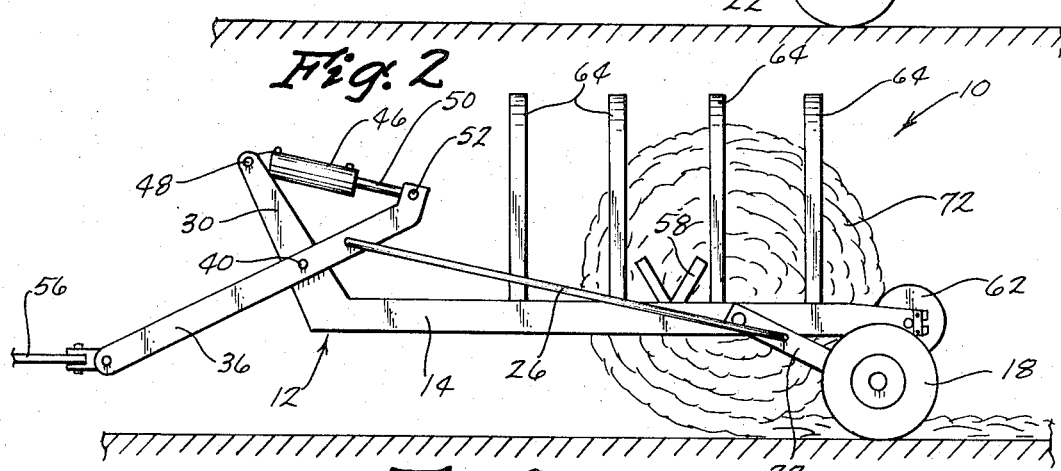
FIG. 2 is a side view of the device illustrating the bale having been moved out of ground engagement.
Figure 3:
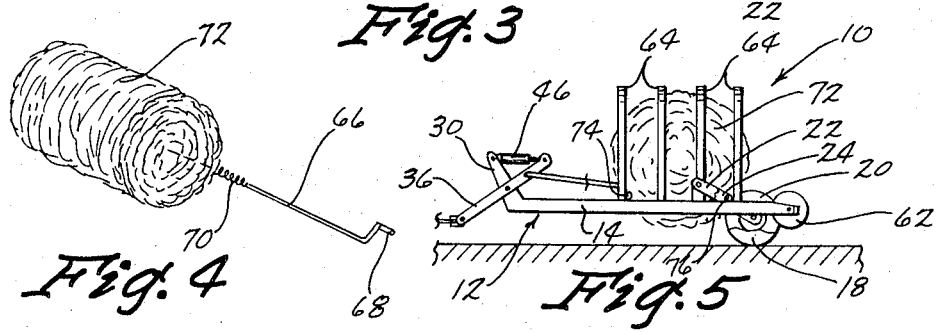
FIG. 3 is a side view illustrating the manner in which the bale is unrolled.
Figure 4:
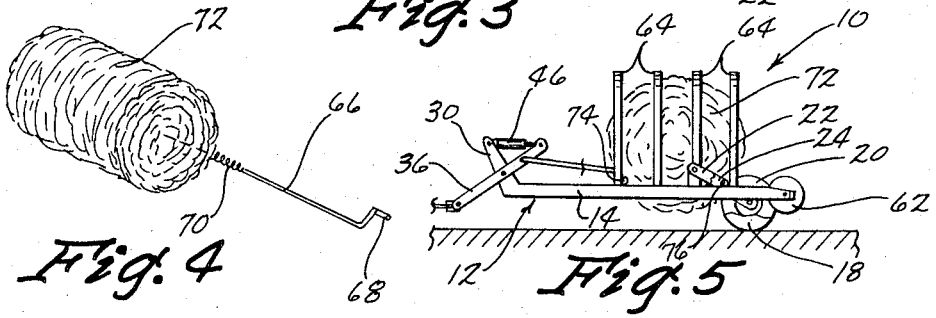
FIG. 4 is a perspective view illustrating the manner in which an elongated shaft is extended through the center of the bale.

The bale transporting and unrolling device of this invention is referred to generally by the reference numeral 10 in FIGS. 1 - 3. Device 10 comprises generally a frame means 12 including side frames 14 and 16. Wheels 18 and 20 are secured to arms 22 and 24 which are pivotally secured to side frames 14 and 16 respectively. Rods 26 and 28 are pivotally secured at their rearward ends to the arms 22 and 24 respectively and extend forwardly and upwardly therefrom as seen in the drawings.

Side frames 14 and 16 are provided with upwardly extending portions 30 and 32 at their forward ends which have a cross brace extending therebetween as seen in FIG. 1. Arms 36 and 38 are pivotally secured to the side frames 14 and 16 at 40 and 42 and have a brace 44 secured to and extending between their rearward ends as seen in FIG. 1.

A hydraulic cylinder 46 is pivotally connected at its base end to cross brace 34 at 48 and has its rod 50 pivotally connected to cross brace 44 at 52. Bar 54 is pivotally connected at its opposite ends to the forward ends of arms 36 and 38 and is adapted to be connected to the hitch 56 of a prime mover such as a tractor or the like. As seen in FIG. 1, the forward ends of rods 26 and 28 are pivotally secured to the arms 36 and 38 respectively rearwardly of their pivotal connection with the side frames 14 and 16.

Side frames 14 and 16 are provided with V-shaped supports 58 and 60 respectively which extend upwardly therefrom. The numeral 62 refers to a roller which is rotatably secured to the ends of the side frames 14 and 16 by any convenient means such as that illustrated in the drawings. One end of roller 62 is pivotally connected to side frame 16 so that it may be moved from the closed position illustrated by solid lines in FIG. 1 to the open position illustrated by broken lines in FIG. 1. The numeral 64 refers to inverted U-shaped hoops secured to the side frame 14 and 16 and extending therebetween as illustrated in the drawings.

The numeral 66 refers to an elongated support means or shaft having a handle 68 at one end and auger or screw flighting 70 at its other end. The shaft 66 is adapted to be extended through the center of the bale 72 by sticking the auger flighting 70 into one end of the bale at the center thereof and then rotating the shaft 66 by the handle 68 so that the shaft 66 screws itself through the bale. The shaft 66 is screwed through the bale until the opposite ends of the shaft extend outwardly from opposite ends of the bale.

The method of using the device 10 is as follows. Normally, the bale 72 would be supported on the ground. The prime mover is maneuvered into position forwardly of the bale with the roller 62 then being pivotally moved to the position illustrated by broken lines in FIG. 1 so that the rearward end of the frame means is opened. The frame means is then moved rearwardly relative to the bale so that the bale is received between the side frames 14 and 16 as illustrated in the drawings. If the hydraulic cylinder 46 had not previously been actuated, the cylinder would be actuated at this time to cause the side frames 14 and 16 to be lowered relative to the ground until the side frames 14 and 16 were positioned at least below the center of the bale. The shaft 66 is then screwed through the center of the bale until the opposite ends thereof protrude outwardly from the opposite ends of the bale and so that the opposite ends of the shaft are positioned above the supports 58 and 60. Roller 62 is then moved back to its closed position illustrated by solid lines in FIG. 1. Hydraulic cylinder 46 is then actuated to withdraw the rod 50 into the cylinder so that the side frames 14 and 16 are moved upwardly relative to the ground which causes the opposite ends of the shaft 66 to be engaged by the supports 58 and 60 which causes the bale to be moved out of ground engagement as illustrated in FIG. 2. The bale may then be transported to the desired location.

When the bale has been moved to the desired location, the hydraulic cylinder 46 is again actuated to lower the side frames 14 and 16 until the bale is in ground engagement. The shaft 66 is then unscrewed from the bale and removed therefrom. The prime mover is then moved forwardly so that the roller 62 engages the rearward end of the bale as illustrated in FIG. 3. Continued forward movement of the frame means by the prime mover causes the bale 72 to unroll as seen in FIG. 3. The fact that the bale 72 can be unrolled facilitates the feeding of the bale to the cattle.

Figure 5:
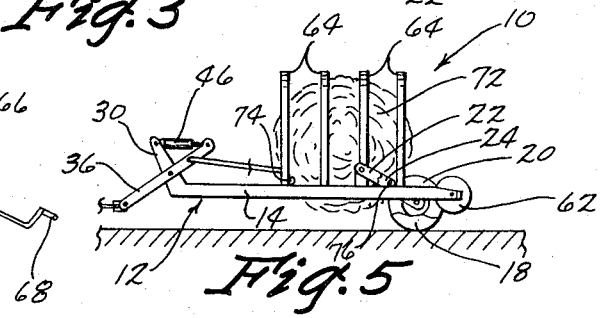
FIG. 5 is a side view of a modified form of the device.

A modified form of the device is illustrated in FIG. 5 and is identical to the device illustrated in FIGS. 1 and 3 except that a pair of pipes 74 and 76 are extended beneath the bale 72 with the opposite ends of the pipes being supported by the frame means 14 and 16. The pipes 74 and 76 eliminate the need for screwing the shaft through the center of the bale as in the embodiment of FIGS. 1 – 3.

Thus it can be seen that a novel transporting and unrolling device has been provided which permits the large and cumbersome bales to be transported from one location to another. The device disclosed herein also permits the bales to be unrolled so that the cattle may consume the bale.

Thus it can be seen that the device of this invention accomplishes at least all of its stated objectives.

I claim:
1. A bale transporting device, comprising,
a wheeled frame means having rearward and forward ends, means on the forward end of said wheeled frame means for connection to a prime mover,
means on said frame means for raising and lowering said frame means relative to the ground,
the rearward end of said frame means being open to permit said frame means to be moved rearwardly with respect to a ground supported bale so that said frame means extends around said bale,
an elongated support means for engaging and supporting said bale,
and means on said frame means for engaging the opposite ends of said elongated support means whereby upward movement of said frame means will cause said bale to be raised from the ground.

2. The device of claim 1 wherein said elongated support means comprises an elongated shaft which is screwed through the center of the bale until the opposite ends of the shaft protrude from opposite ends of the bale.

3. The device of claim 1 wherein said elongated support means comprises a pair of pipes which engage the underside of the bale.

4. The device of claim 1 wherein an elongated roller means is rotatably secured to and extends across the rearward end of said frame means for engagement with the bale during subsequent bale unrolling operations.

5. The device of claim 4 wherein said roller means is secured to said frame means for movement between closed and open positions.

6. The device of claim 4 wherein an inverted U-shaped hoop means is secured to said frame means.

7. The device of claim 1 wherein said frame means comprises first and second side frames, first and second wheels pivotally secured to said first and second side frames respectively, said first and second side frames having upwardly extending forward end portions, a first support secured to and extending between the upper ends of said forward end portions, first and second arms pivotally secured intermediate their lengths to said forward end portions, said first and second arms having rearward and forward ends, a second support secured to and extending between the rearward ends of said arms, means connecting the forward ends of said arms to the prime mover, means pivotally connecting said arms with said pivotal wheels, and a power cylinder means secured to and extending between said first and second supports for pivotally moving said wheels relative to said frame means so that said frame means may be selectively raised and lowered relative to the ground.

8. The method of transporting and unrolling a bale comprising the steps of:
positioning a wheeled frame means around at least one bale,
raising the bale out of ground engagement with the frame means,
transporting the bale to the desired feeding location,
lowering the bale into ground engagement,
and rolling the bale along the ground with the frame means to cause the bale to unroll.

9. The method of claim 8 wherein said frame means has an elongated roller at the rearward end thereof which rotatably engages the bale as the frame means is moved forwardly.

* * * * *